United States Patent [19]
Lamb

[11] Patent Number: 5,938,238
[45] Date of Patent: Aug. 17, 1999

[54] PNEUMATIC LIFT CONTROL DEVICE

[75] Inventor: Roger Lamb, Upland, Calif.

[73] Assignee: Lamb Components, Inc., Upland, Calif.

[21] Appl. No.: 08/926,799

[22] Filed: Sep. 10, 1997

[51] Int. Cl.⁶ .............................. B60R 21/00; B60S 9/00
[52] U.S. Cl. ...................................... 280/755; 280/5.513
[58] Field of Search .................................. 280/755, 5.513

[56] References Cited

U.S. PATENT DOCUMENTS

| | | | |
|---|---|---|---|
| 1,478,428 | 12/1923 | Duncan | 280/755 |
| 1,492,487 | 4/1924 | Stokes | 280/755 |
| 2,280,327 | 4/1942 | Ware | 175/264 |
| 2,891,331 | 6/1959 | Pleska | 37/124 |
| 3,523,697 | 8/1970 | O'Sullivan | 280/150 |
| 3,702,037 | 11/1972 | Toy et al. | 46/201 |
| 3,757,459 | 9/1973 | Buck et al. | 46/202 |
| 3,806,149 | 4/1974 | Huszar | 280/106.5 |
| 4,007,949 | 2/1977 | Norcia et al. | 280/767 |
| 4,079,798 | 3/1978 | Ferris | 180/24.02 |
| 4,274,656 | 6/1981 | Warren | 280/757 |
| 4,522,420 | 6/1985 | Hannappel | 280/755 |
| 4,886,294 | 12/1989 | Nahachewski | 280/755 |
| 4,988,120 | 1/1991 | Jones | 280/755 |
| 5,181,733 | 1/1993 | Tague | 280/304 |
| 5,316,328 | 5/1994 | Bussinger | 280/755 |
| 5,516,135 | 5/1996 | Christenson | 280/405 |

*Primary Examiner*—Kenneth R. Rice
*Attorney, Agent, or Firm*—Christie, Parker & Hale, LLP

[57] ABSTRACT

Pneumatic lift control devices for use in progressively controlling the amount of front end lift of an automobile during acceleration comprise a housing having an annular chamber disposed therein. A piston is slidable disposed axially within the annular chamber. Means are provided for retaining the piston within the annular chamber. A pressure-tight seal is formed between the piston and the annular chamber to enable pneumatic pressurizing of the claimer, and to prevent pressure loss from the chamber during slidable movement of the piston. A snubber is disposed within the annular chamber between the piston and a portion of the housing to resist axial displacement of the piston within the chamber. The snubber is formed from an elastically deformable material that, with the pressurized chamber, provides a progressive resistance to piston axial displacement. The piston is adapted to accommodate attachment with a first structural member, and means are provided to connect the housing to a second structural member to facilitate placement of the device therebetween. When placed between first and second structural members of a lift control frame structure that are subjected to compression or tension forces during conditions of maximum acceleration, the pressurized chamber and snubber together act to progressively resist axial displacement of the piston within the housing, thereby providing a progressive rate of lift control that minimizes or eliminates unloading of the rear wheels.

9 Claims, 5 Drawing Sheets

PNEUMATIC LIFT CONTROL DEVICE

FIELD OF THE INVENTION

This invention relates to devices that are used to control the amount that an automobile front end lifts away from the ground during acceleration and, more particularly, to pneumatic devices that are adapted to provide a progressive rate of lift control when installed in a lift control frame tubular structure extending from the rear of an acceleration race car.

BACKGROUND OF THE INVENTION

Automobiles and, more specifically, race cars such as dragsters, funny cars and the like, that are designed for acceleration racing are typically operated at race tracks to determine their quickness within a given distance, e.g., within a quarter of a mile. Such cars are specially modified to produce high levels of horsepower to the rear wheels in an effort to minimize the time that it takes the car to cover such specified distance. Such cars are also often modified in other ways to minimize such time, e.g., by making the car body more aerodynamic to minimize air drag, and by minimizing the weight of the car.

Under conditions of maximum acceleration it is not uncommon for the front end and/or wheels of the car to be lifted away from the ground, thereby raising the center of gravity of the vehicle and making the car difficult or impossible to control. When this occurs, the driver must either discontinue his run, by letting off of the gas and/or activating the car brakes, or risk damaging the car and/or possibly injuring him or her self.

In an effort to control or reduce the amount of front end lift during conditions of maximum acceleration, lift control frame structures referred to as "wheelee bars" have been devised. Such frame structures 10 are typically of a triangular-shaped tubular construction as illustrated in FIG. 1 comprising: (1) a first mounting point 12 at one end of the triangle, that is connected to an upper portion of a rear part of the car chassis or rear suspension; (2) a second mounting point 14 at another end of the triangle, that is connected to one or more wheel 16 that is oriented to rotate when placed into contact with the ground; and (3) a third mounting point 18 at a final end of the triangle, that is connected to a lower portion of the rear part of the car chassis or rear suspension. The first, second and third mounting points are connected by frame members 20 and 22, respectively. As illustrated in FIG. 1, such frame structure may include two such triangle constructions that each have separate first, second, and third mounting points, and that are attached together by tubular cross members and the like. It is to be understood that the frame structure illustrated in FIG. 1 is exemplary of but one type of lift control frame structure known to exist and that variations of such design may exist.

The lift control frame structure is attached at its first and third mounting point to the rear portion of the car so that the second mounting point extends a distance rearward of the rear end of the car, and so that the structure wheel extends a short distance away from the ground. Under conditions of maximum acceleration, as the front end of the car begins to be lifted upward, the second mounting point and wheel is moved toward the ground. As the front end of the car continues to be lifted upward, the wheel attached to the second mounting point makes contact with the ground, limiting the extend to which the front end of the car can be raised. However, in doing so the frame structure also acts to lift the rear chassis and/or suspension of the car, thereby reducing the load that is placed on the rear wheels. A reduction in the load on the rear wheels is not desired during operating conditions of maximum acceleration because it cases the rear wheels to slip and lose traction with the ground. This reduced traction prevents the car from achieving its maximum acceleration. When this happens during a race, the driver must either let off of the gas or try to control the engine output to regain traction. In either case, such occurrence usually results in car the losing the race.

It is, therefore, desirable, that a device be constructed to progressively control the amount of lift at the front end of a car during conditions of maximum acceleration without unloading the rear end of the car. It is also desirable that such a device be constructed in a manner that permits it to be used in conjunction with existing lift control frame structures.

SUMMARY OF THE INVENTION

Pneumatic lift control devices constructed according to principles of this invention comprise a housing having an annular chamber disposed therein. A piston is slidably disposed axially within the annular chamber. Means are provided for retaining the piston within the annular chamber. A pressure-tight seal is formed between the piston and the annular chamber to enable pneumatic pressurizing of the claimer, and to prevent pressure loss from the chamber during slidable movement of the piston. A snubber is disposed within the annular chamber between the piston and a portion of the housing to resist axial displacement of the piston within the chamber. The snubber is formed from an elastically deformable material that, with the pressurized chamber, provides a progressive resistance to piston axial displacement. The piston is adapted to accommodate attachment with a first structural member, and means are provided to connect the housing to a second structural member to facilitate placement of the device between two structural members.

In a first device embodiment, the device is adapted for use in compression service, e.g., to allow installation between two structural members that are subjected to compression loading during conditions of maximum acceleration of the automobile. In such embodiment, the housing chamber is disposed between a housing closed end and a housing open end. The piston comprises a piston flange section and a piston shaft that extends axially therefrom. The flange is disposed completely within the chamber, and the snubber is disposed between the piston flange and the housing closed end. A piston gland is attached to the housing open end to retain the piston flange within the housing chamber, and includes a piston shaft opening therethrough to accommodate piston shaft passage therethrough. The piston flange includes a seal disposed circumferentially around a radial edge providing a pressure-tight seal between the piston and the chamber, allowing the chamber to be pneumatically pressurized.

The housing includes a mounting chamber at an end opposite the piston gland to accommodate attachment with a second structural member. When inserted between first and second structural members of a lift control frame structure that are subjected to compressive loads during maximum acceleration, the pressurized chamber and snubber act to progressively resist axial displacement of the piston within the chamber, thereby providing a progressive rate of lift control that minimizes or eliminates rear wheel unloading.

In a second device embodiment, the device is adapted for use in tension service, e.g., to allow installation between two structural members that are subjected to tension loading during conditions of maximum acceleration of the automobile. In such embodiment, the housing chamber is disposed between a housing reduced diameter section and a housing open end. The piston comprises a piston flange and a piston shaft that extends axially therefrom. The flange comprises a seal disposed circumferentially around a radial edge to provide a pressure-tight seal against the housing. The reduced diameter section includes a piston shaft opening with a shaft seal disposed therein for accommodating placement of the piston shaft therethrough, and for providing a pressure-tight seal between the housing and the piston shaft, thereby allowing the chamber to be pneumatically pressurized. The piston flange is disposed completely within the chamber, and the snubber is disposed between the piston flange and the housing reduced diameter section.

A structural mounting member is attached to the open end of the housing to both retain the piston flange within the chamber, and to accommodate attachment with a second structural member. When inserted between first and second structural members of a lift control flame structure that are subjected to tension loads during maximum acceleration, the pressurized chamber and snubber act to progressively resist axial displacement of the piston within the chamber, thereby providing a progressive rate of lift control that minimizes or eliminates rear wheel unloading.

BRIEF DESCRIPTION OF THE DRAWINGS

These and other features and advantages of the present invention will become appreciated as the same becomes better understood with reference to the specification, claims and drawings wherein:

DETAILED DESCRIPTION

Lift control devices prepared according to principles of this invention are constructed to provide an adjustable progressive method of controlling the rate of lift of an automobile, and more specifically a drag race-type car, at the time or before the suspension is no longer able to perform such function without causing the rear wheels to become unloaded.

Figure 2:
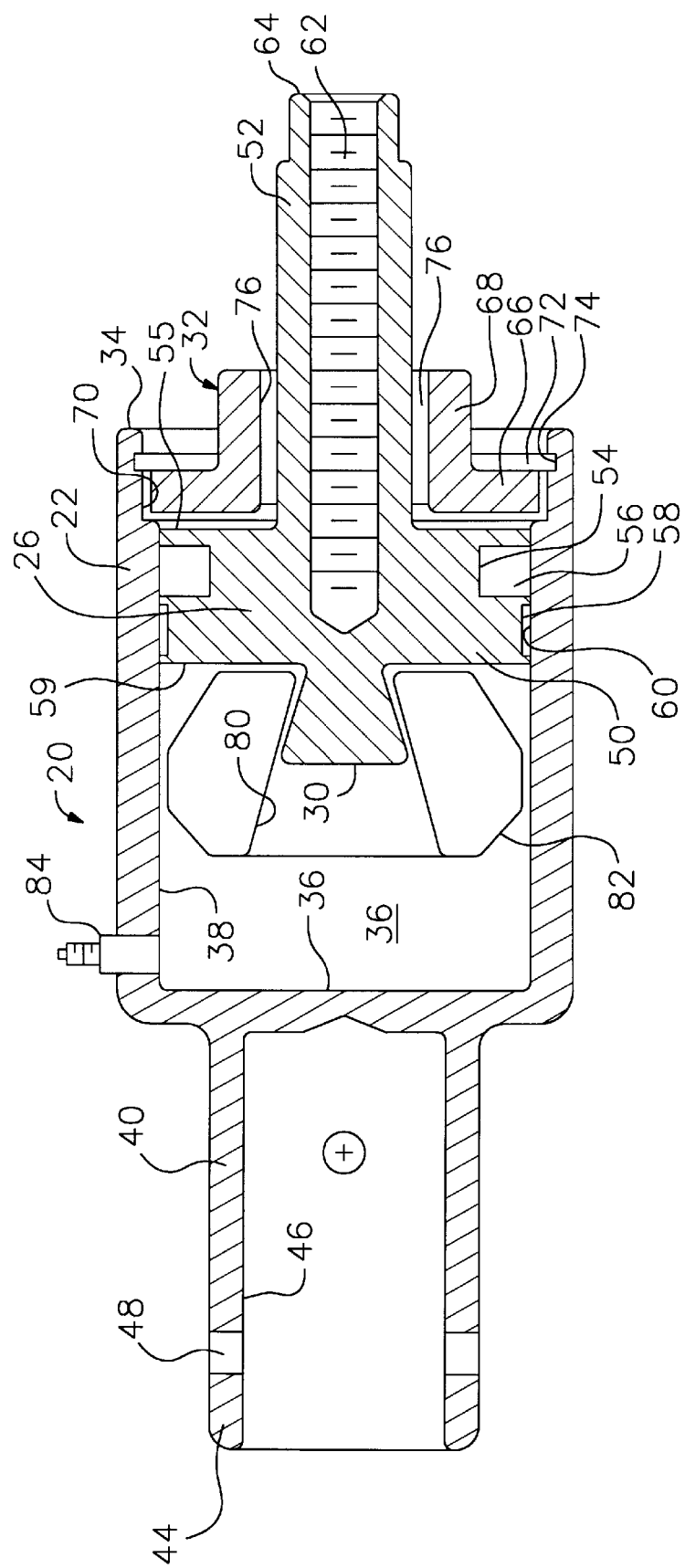
FIG. 2 is a cross-sectional side elevation view of a first embodiment of a lift control device constructed according to principles of this invention.

Referring to FIG. 2, a first embodiment pneumatic lift control device 20 comprises a housing 22 that is generally cylindrical in shape and comprises a pneumatic chamber 24 disposed therein. A piston 26 is axially displaceable within the pneumatic chamber 24, and includes a progressive elastomeric snubber 28 attached to an end 30 of the piston that is disposed within the chamber. A piston gland 32 is attached to an open end 34 of the housing 22 to both retain the piston 26 within the housing and align and guide the piston during axial displacement therein. The first embodiment device 20 is designed for use in compression service, i.e., to provide a progressive rate of lift control when a compression force is causing the piston to be axially displaced within the housing. The device 20 is, therefore, adapted for mounting to a compression member of a lift control frame structure, and the pneumatic chamber 24 is charged with a desired amount of a compressed medium, such as air. The charge of compressed air in combination with the snubber 28 provide progressive resistance to axial displacement of the piston within the housing, thereby providing progressive resistance to axial displacement of the piston within the housing, thereby providing progressive front end lift control of a race car that minimizes or eliminates the unloading of the rear tires.

The housing 22 has the open end 34 at one of its axial ends, and has a closed end 36 at an opposite axial end. The pneumatic chamber 24 has an annular configuration, extends axially between the open end 34 and closed end 36, and is defined radially by a housing inside wall surface 38. In an exemplary embodiment, the pneumatic chamber 24 has a bore size of about 2⅛ inch. The housing can be made from conventional structural materials capable of operating as a pneumatic pressure vessel, and capable of withstanding the large stresses and forces imposed thereon during the maximum acceleration of a race car, such as metal, metal alloy and the like. It is also desired that the material used to form the housing be lightweight. In a preferred embodiment, the housing is machined from a solid billet of aluminum, aircraft quality 7075 anodized aluminum being the most preferred.

The housing includes an annular collar 40 that is integral with the housing 22 and that extends axially away from the closed end 36. A tube chamber 42 is disposed within the annular collar 40 and extends axially from the closed end 36 to an open end 44 of the collar, and is defined radially by an inside wall surface 46 of the collar. The tube chamber 42 is sized and configured to accommodate placement of a tube end from a lift control frame structure therein, as will be explained in better detail below. For example, the tube chamber may be configured to accommodate placement of a 1⅛ inch tube therein. The annular collar 40 includes means for retaining the tube end therein, such means can be selected from the group of conventional retaining means including, the use of pins, nuts and bolts, and the like. In an exemplary embodiment, the annular collar 40 includes mounting holes 48 that extend through diametrically opposed portions of the collar wall to accommodate placement of a pin or bolt therethrough to retain the frame structure tube end within the tube chamber 42.

The piston 26 includes an integral piston flange 50 at one end that extends radially from an integral piston shaft 52. In an exemplary embodiment, the flange 50 has a circular radial edge that is sized to fit completely within the housing pneumatic chamber 24 adjacent the housing inside wall surface 38. The piston flange 50 includes a seal groove 54 that is disposed within the radial edge and that is positioned adjacent an axial flange surface 55 that faces the housing open end 34. The seal groove 54 is sized and configured to accommodate a piston seal 56 therein. The piston seal 56 is circular in shape, and is made from a material capable of retaining a pressure tight seal between the piston flange 50 and the housing inside wall surface 38, allowing the chamber 24 to be pneumatically pressurized and retain its pressure during the operation of the race car. The piston seal 56 can be in the form of an O-ring seal, a lip seal, and the like. In an exemplary embodiment, the piston seal is in the form of a lip seal that is made from an elastomeric material.

The piston flange 50 also includes a bearing groove 58 that is disposed within the radial edge and that is positioned adjacent the seal groove 54 and adjacent an axial flange surface 59 that faces the housing closed end 36. The bearing groove 58 is sized and configured to accommodate a piston flange bearing 60 therein. The flange bearing 60 can be in the form of a material strip that is wound into the bearing groove 58. Suitable flange bearing materials include those having low surface friction properties, such as conventional fiber filled bearing materials and the like. It is desired that the piston flange 50 have a diameter, and that both the piston seal 56 and flange bearing 60 be sized to permit both axial piston displacement within the housing pneumatic chamber and prevent any loss of charge pressure within the chamber during such displacement.

The piston 26 includes the end 30 that extends axially away from the piston flange and that has a diameter that is less than that of the flange. The end 30 is configured to retain the progressive elastomeric snubber 28 thereon, which snubber will be explained in better detail below. In an exemplary embodiment, the piston end 30 has a tapered shape with an increasing diameter moving away from the piston to retain a snubber having a complementary central opening thereon.

The piston shaft 52 extends axially away from the flange 50 in a direction opposite from the piston end 30, i.e., toward the housing open end 34. In an exemplary embodiment, the piston shaft 52 has an axial length that is at least twice that of the flange. The piston shaft 52 includes an annular mounting chamber 62 that is disposed therein and that extends from the piston flange 50 to an open end 64 of the shaft. The mounting chamber 62 is sized and configured to accommodate attachment with a tube end a lift control frame structure. In an exemplary embodiment, the mounting chamber 62 has a threaded inside wall surface to accommodate threaded attachment to a threaded member of the frame structure, e.g., a threaded clevis pin. For example, the mounting chamber 62 may have a thread size of about ½ inch by 20 pitch, ⅝ inch by 18 pitch, and the like. The tube chamber 42 of the housing annular collar 40 and the mounting chamber 62 of the piston shaft enables the first embodiment device 20 to be installed between compression members of the lift control frame system.

The piston gland 32 includes a flared end 66 and a collar section 68 that extends axially therefrom. The flared end 66 has a circular radial edge and is sized to fit within a gland groove 70 disposed circumferentially within the housing inside wall surface 38 adjacent the open end 34. A retaining means is disposed adjacent the housing open end 34 to attach and retain piston gland 32 to the housing. In an exemplary embodiment, the retaining means is in the form of a retaining ring 72 that is disposed within a retaining groove 74 disposed circumferentially within the housing inside wall surface 38 adjacent the open end 34. When installed within the retaining groove 74, an axially facing surface of the retaining ring 72 is placed in contact with an adjacent axially facing surface of the piston gland flared end 66, thereby preventing its axial displacement from the housing.

The piston gland collar section 68 extends axially away from the flared end 66 and away from the housing 22. The collar section 68 has an annular opening 76 therein that is sized to accommodate placement of the piston shaft 52 therethrough. The annular opening 76 includes a piston shaft bushing 78 disposed therein. The piston shaft bushing can be of the same material and design as previously described for the piston flange bearing 60. It is desired that the collar section 68 have an axial length that is sufficient to provide a desired degree of piston alignment and guidance during axial displacement of the piston. It is, therefore, desired that the annular opening 76, and shaft bushing 78, be sized and configured to both facilitate axial displacement of the piston shaft therein, and provide alignment and guidance to the piston during such displacement. In an exemplary embodiment, the collar section 68 has an axial length that is at least twice that of the flared end 66.

The piston 26 and piston gland 32 are made from the same materials previously described for making the housing. In an exemplary embodiment, the piston and piston gland are machined from aircraft quality 7075 anodized aluminum.

Referring to the progressive elastomeric snubber 28, it is desired that such snubber be either machined or molded from an elastomeric material that is capable of elastically deforming when compressively loaded between the piston and housing to fill any voids in the pneumatic housing chamber 24. Such materials are desired as such ability to deform to fill such voids enables that device to provide a truly progressive rate of resistance to piston axial displacement, and thereby a progressive rate of lift control. The ability for the snubber to elastically deform to fill all chamber voids also depends on the geometric design of the snubber. In an exemplary embodiment, the snubber is molded from a commercially available polyurethane material. The snubber has a donut-shaped configuration, with a central opening 80 adapted to permit attachment with the piston end 30. Such retaining attachment is desired so that the snubber moves with the piston during its axial displacement, and does not float freely within the chamber, which could jam and otherwise interfere with the proper axial displacement of the piston. The snubber 28 has a diameter that is slightly smaller than that of the housing inside wall surface 38, and has an axial length that is about twice the axial length of the piston end 30. The snubber also has tapered radially directed surfaces 82 that are configured to fill adjacent chamber voids during axial displacement of the piston and compression of the snubber.

The snubber is sized and configured to provide a progressive rate of piston displacement, and thus progressive rate of lift control, during its compression to fill the voids in the pneumatic chamber 24. It is to be understood that such performance by the snubber may be achieved by using snubbers of different sizes and/or configurations than that specifically described and illustrated, depending on such factors as the size and shape of the chamber, piston, and the like. Accordingly, the use of all snubbers of different shapes and/or configuration, that perform in the described manner, are intended to be within the scope of this invention.

Once the snubber has been elastically deformed to fill the chamber voids, by increasing axial displacement of the piston, the snubber becomes incompressible and serves to limit the stroke length of the piston. In an exemplary embodiment, the snubber is designed to act in such manner before the piston end 30 makes contact with the housing closed end 36, thereby preventing metal-to-metal contact.

The first embodiment device is operated by filling the housing pneumatic chamber 24 with a desired amount of pressurized medium, such as air or the like. The pressurized medium is introduced into the chamber 24 via a valve 84 that is disposed through the wall of the housing 22 and that is designed to prevent the release of such charge. The pressure of air used to produce the desired progressive effect will vary depending on the particular application, e.g., the type of race car that is used, the horsepower of such race car, the configuration and size of frame structure that is used, track conditions, and the like. In en exemplary embodiment, the device is constructed to accommodate up to about 1,000 psig of pressurizing medium. In practice, the desired progressive effects of the device may be achieved by using in the range of from about 10 to 200 psig. Ideally, the amount of charge pressure should be that which allows the piston to compress initially, when subjected to conditions of maximum acceleration, progressively resist, and then finally limit piston axial displacement during the run without unloading the rear wheels. Ideally, it is also desired that the valve 84 be adapted to check or relieve pressure in the event of an overpressure condition.

Figure 1:
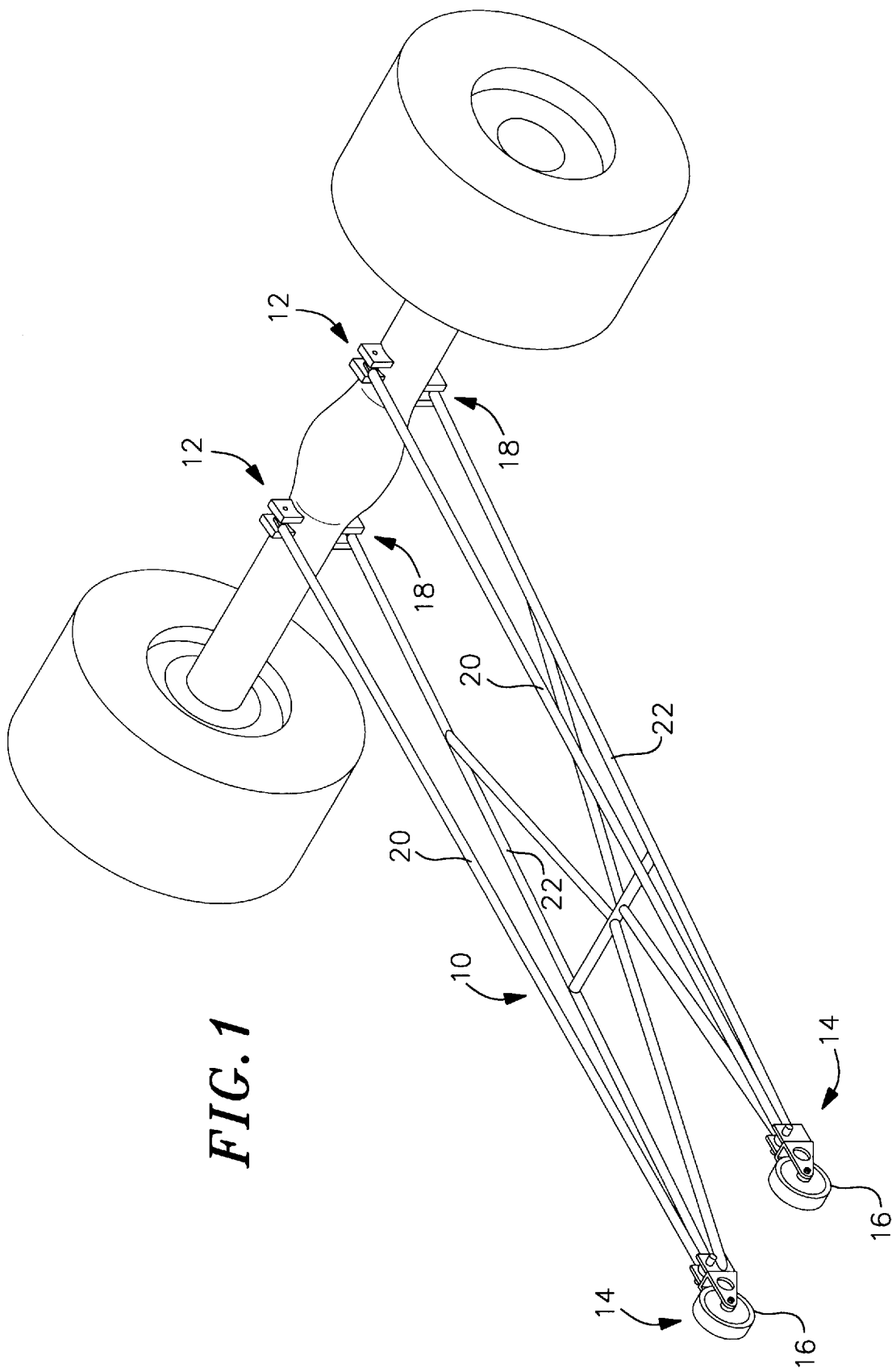
FIG. 1 is a schematic perspective view of a prior art frame structure for controlling lift.
Figure 3:
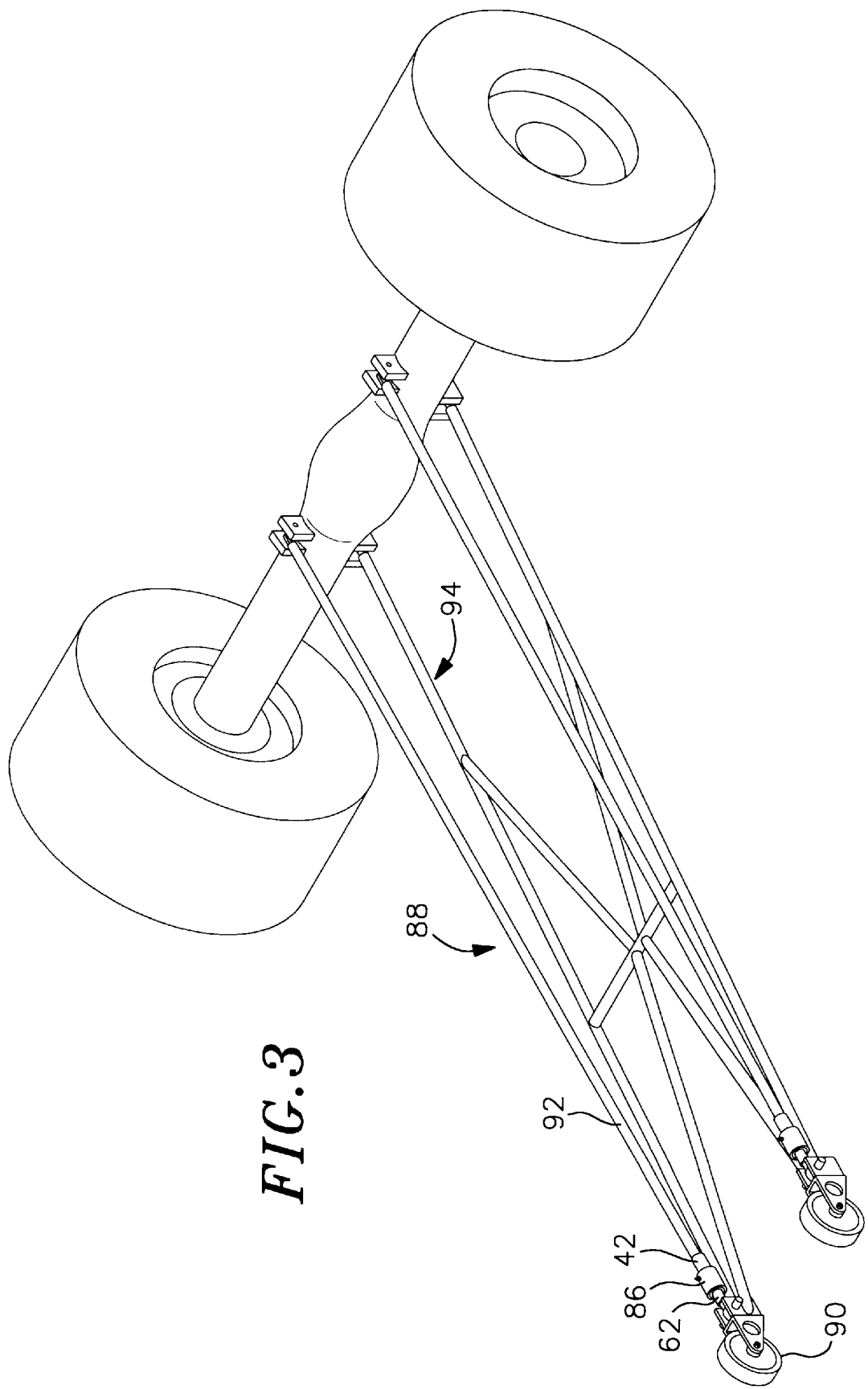
FIG. 3 is a schematic perspective view of a compression lift control system comprising a pair of first embodiment lift control devices mounted to a lift control frame structure.

Referring to FIG. 3, the first embodiment device 86 is installed in a lift control frame structure 88 similar to that illustrated in FIG. 1. The first embodiment device is constructed to operate in compression service, i.e., where a compression force exerted on the piston during conditions of maximum acceleration causes the piston to be axially displaced within the pneumatic chamber. The first embodiment device 86 is, therefore, installed within the frame structure at a location that is subjected to compression loads during the maximum acceleration of the race car due to the lifting of the front end of the car and the placement of the wheels 90 against the ground in response thereto.

In a first exemplary compression lift control system embodiment, the device 86 is attached at its mounting chamber 62 to a clevis pin or the like that is attached adjacent the wheel 90, and is attached at its tube chamber 42 to a tube end 92 of the compression member 94 of the frame structure 88. The number of devices 86 that are attached to the frame structure depends on the particular structure design. For example, FIG. 3 illustrates a frame structure having two wheels and two separate compression members 94, wherein two of the first embodiment devices are used. For example, a frame structure having only a single wheel and/or compression frame member may use only one device. Additionally, it is to be understood that devices of this invention can be either retrofit with existing lift control frame structures or can be installed into lift control structures designed specifically for their use.

In a second exemplary compression lift control system embodiment (not shown), the first embodiment device may be mounted to a compression member of the frame structure adjacent the rear chassis and/or suspension, rather than adjacent the frame structure wheel 90. In either case, the device serves the same purpose under compression load conditions. The choice of location for the device depends on such factors as the design of the car and the ease of accessing the device for any needed pressure adjustments.

Figure 4:
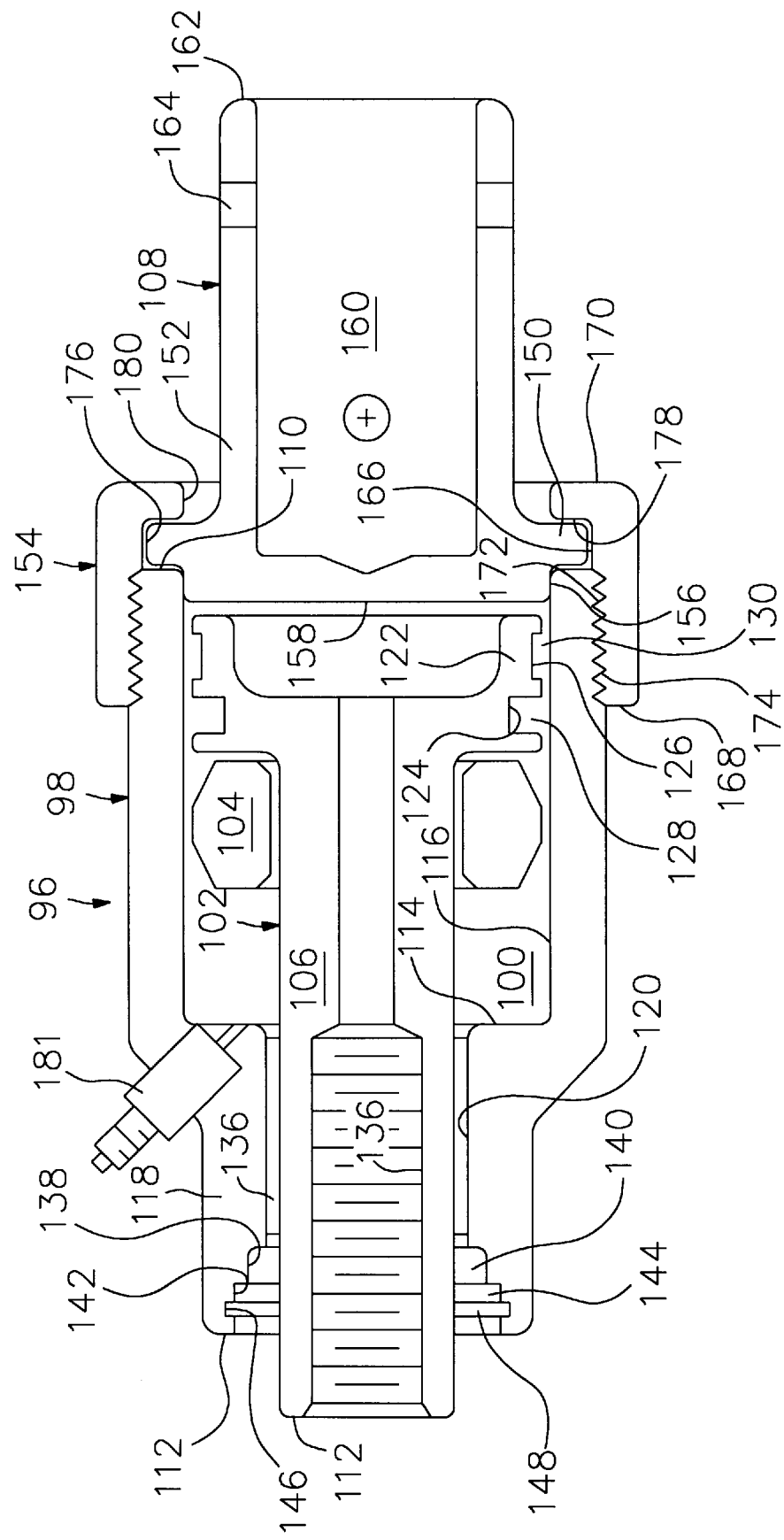
FIG. 4 is a cross-sectional side elevation view of a second embodiment of a lift control device constructed according to principles of this invention.

Referring to FIG. 4, a second embodiment pneumatic lift control device 96 is similar to the first embodiment device described above, comprising a housing 98 that is generally cylindrical in shape and comprises a pneumatic chamber 100 disposed therein. A piston 102 is axially displacable within the pneumatic chamber 98, and includes a progressive elastomeric snubber 104 disposed around a shaft 106. A tube mounting member 108 is attached to an open end 110 of the housing 98 to retain the piston 102 within the housing. The second embodiment device 96 is designed for use in tension service, i.e., to provide a progressive rate of lift control when a tension force is causing the piston to be displaced within the housing. The device 96 is, therefore, adapted for mounting to a tension member of a lift control frame structure, and the pneumatic chamber 100 is charged with a desired amount of a compressed medium, such as air. Like the first embodiment device, the charge of compressed air in combination with the snubber 104 provide progressive resistance to axial piston displacement within the housing, thereby providing progressive front end lift control to a race car that minimizes or eliminates the unloading of the rear tires.

The housing 98 has the open end 110 at one of its axial ends, and has a reduced diameter open end 112 at its other axial end. The pneumatic chamber 100 disposed within the housing has an annular configuration, extends axially between the open end 110 and a shoulder 114, and is defined radially by a housing inside wall surface 116. The housing 98 can be made from the same desired and preferred materials described above for the first embodiment device.

The housing includes a neck section 118 that has an outside diameter less than the remaining housing, and that extends axially from the shoulder 114 to the reduced diameter open end 112. The neck section 1 18 includes an annular piston opening 120 therethrough that has a diameter less than that of the housing inside wall surface 116, and that extends axially from the shoulder 114 to the reduced diameter open end 112.

The piston 102 includes an integral flange 122 that extends radially outward from the piston shaft 106. The piston flange 122 is disposed completely within the housing chamber 100 and includes a circular radial edge that includes a seal groove 124 and a flange bearing groove 126, for accommodating a respective flange seal 128 and flange bearing 130, that are each sized, configured, and/or made from the same materials as that described for the first device embodiment. In an exemplary embodiment, the piston flange 122 is configured having a concave axially facing surface directed toward the housing open end 110 to reduce the weight of the piston.

The piston shaft 106 extends axially from the piston flange 122 towards the housing reduced diameter open end 112. The piston shaft has a diameter that is less than that of the flange and has a mounting chamber 132 disposed therein that extends axially a distance from a shaft open end 134 opposite the flange 112. The mounting chamber 132 is configured in the manner previously described for the first device embodiment to accommodate attachment with an end portion of a lift control frame structure. In an exemplary embedment, the piston shaft 106 is hollow to take advantage of weight savings, and the mounting chamber 132 extends along a predetermined axial length of the shaft.

The annular piston opening 120 through the neck section 118 of the housing is sized to accommodate the axial displacement of the piston shaft 106 therethrough. The piston shaft 106 is configured having a sufficient axial length so that the shaft open end 134 extends a distance outwardly from the reduced diameter open end 112 when the piston flange 122 is positioned adjacent the housing open end 110. The annular piston opening 120 comprises a piston shaft bushing 136 that extends axially therein between the shoulder 114 and a piston seal groove 138. The piston shaft bushing 136 is configured and made from the same materials as those previously described for the piston shaft bushing of the first device embodiment. The annular piston opening 120 is of sufficient axial length to provide a desired degree of piston alignment and guidance during axial displacement to prevent binding at the line.

The annular piston opening 120 includes a piston seal groove 138 that is disposed circumferentially therein. The seal groove 138 has a diameter that is greater than the portion of the piston opening accommodating the bushing 136, and is sized and configured to accommodate a piston shaft seal 140 that is disposed therein. The piston shaft seal 140 is made from the same material described above for the piston flange seal, and is designed to provide a pressure-tight seal between the annular piston opening 120 and the piston shaft 106. Together the flange sale 128 and the shaft seal 140 enable the chamber 100 to be pneumatically pressurized and to retain its pressure during axial displacement of the piston.

A retaining spacer groove 142 is disposed circumferentially within the annular piston opening 120 and is positioned axially adjacent the piston seal groove 138. The retaining spacer groove has a diameter that is greater than that of the piston seal groove 138, and is configured to accommodate a retaining spacer 144 that is disposed therein. The retaining spacer is made from a suitable structural material such as metal, metal alloy and the like, and provides an axial facing surface that is placed against a facing piston seal axial surface for maintaining the piston seal in its groove.

A retaining ring groove 146 is disposed circumferentially within the annular piston opening 120 and is positioned axially adjacent the retaining spacer groove 142. The retaining ring groove 146 has a diameter that is greater than that of the retaining spacer groove 142, and is configured to accommodate a retaining ring 148 that is disposed therein. The retaining ring is made from a suitable structural material such as metal, metal alloy and the like, and together with the retaining spacer serves to retain the piston seal in its groove.

The tube mounting member 108 comprises a flared section 150 that extends radially from a collar section 152. The flared section 150 is adapted to be attached to the open end 100 of the housing by suitable attachment means. The attachment means can be in the form of conventional means used to attach members of a pressure vessel together. For example, an acceptable attachment means can be in the form of a retaining ring attachment, as previously described for attachment of the piston gland in the first device embodiment. In an exemplary embodiment, such attachment means is in the form of a threaded coupling member 154.

The flared section 150 of the tube mounting member 108 has a diameter that is similar to that of the housing 98 to facilitate attachment by use of such threaded coupling. A reduced diameter section 156 extends axially away from the flared section 150 towards the housing neck section 118, and has a diameter that is slightly less than that of the housing inside wall surface 116 to permits its placement therein. The reduced diameter section 156 has a closed axially facing end 156 that is directed toward an axially facing surface of the piston flange 122.

The collar section 152 extends axially away from the flared section 150, has a diameter that is less than both of the flared section and the reduced diameter section, and includes an annular tube chamber 160 that is sized and configured in the same manner as that previously described for the tube chamber in the first device embodiment to accommodate attachment with a tube end of the frame structure, and further includes an open end 162 and mounting holes 164.

The threaded coupling member 154 has an annular opening 166 that extends therethrough from a first axial end 168 to a second axial end 170. The annular opening includes a threaded inside wall surface 172 disposed adjacent the first end 168 that is sized to complement threads 174 disposed around an outside surface of the housing adjacent the open end 110. The annular opening 166 includes a non-threaded portion 176 that extends axially from the threaded wall surface 172 to a shoulder 178 that defines both the second end 170, and that defines a reduced diameter opening 180 therethrough. The reduced diameter opening 180 has a diameter that is less than the diameter of the tube mounting member flared section 150, and that is greater than the diameter of the collar section 152.

The tube mounting member 108 is attached to the housing 98, after placing the piston 102 within the housing chamber 100, by placing the flared section 150 of the tube mounting member adjacent the housing open end 110, fitting the threaded coupling member over the collar section 152 of the tube mounting member 108, and threadably engaging the coupling member with the housing and tightening the two together.

Referring to the progressive elastomeric snubber 104, the snubber is made from the same material previously described above for the first embodiment device. In an exemplary second device embodiment, the snubber is not attached to the piston, but is slidably disposed around the piston shaft to that it is axially free floating. In the second device embodiment, attachment to the piston is not needed to prevent interference with the piston movement because its placement over the piston shaft acts to guide and control the position of the piston so that it will not impair piston axial displacement. To facilitate such free sliding snubber axial movement it is desired that the snubber have an inside diameter that is slightly larger than the diameter of the piston shaft. The snubber performs in the same manner as that previously described for the first device embodiment.

Like the first embodiment device, the second embodiment device is operated by pressurizing the housing pneumatic chamber 100 with a desired amount of a pressurizing medium, such as air or the like. The pressurized medium is introduced into the chamber 100 via a valve 181 that is disposed through the wall of the housing 98, and that is designed to prevent the release of such charge.

Figure 5:
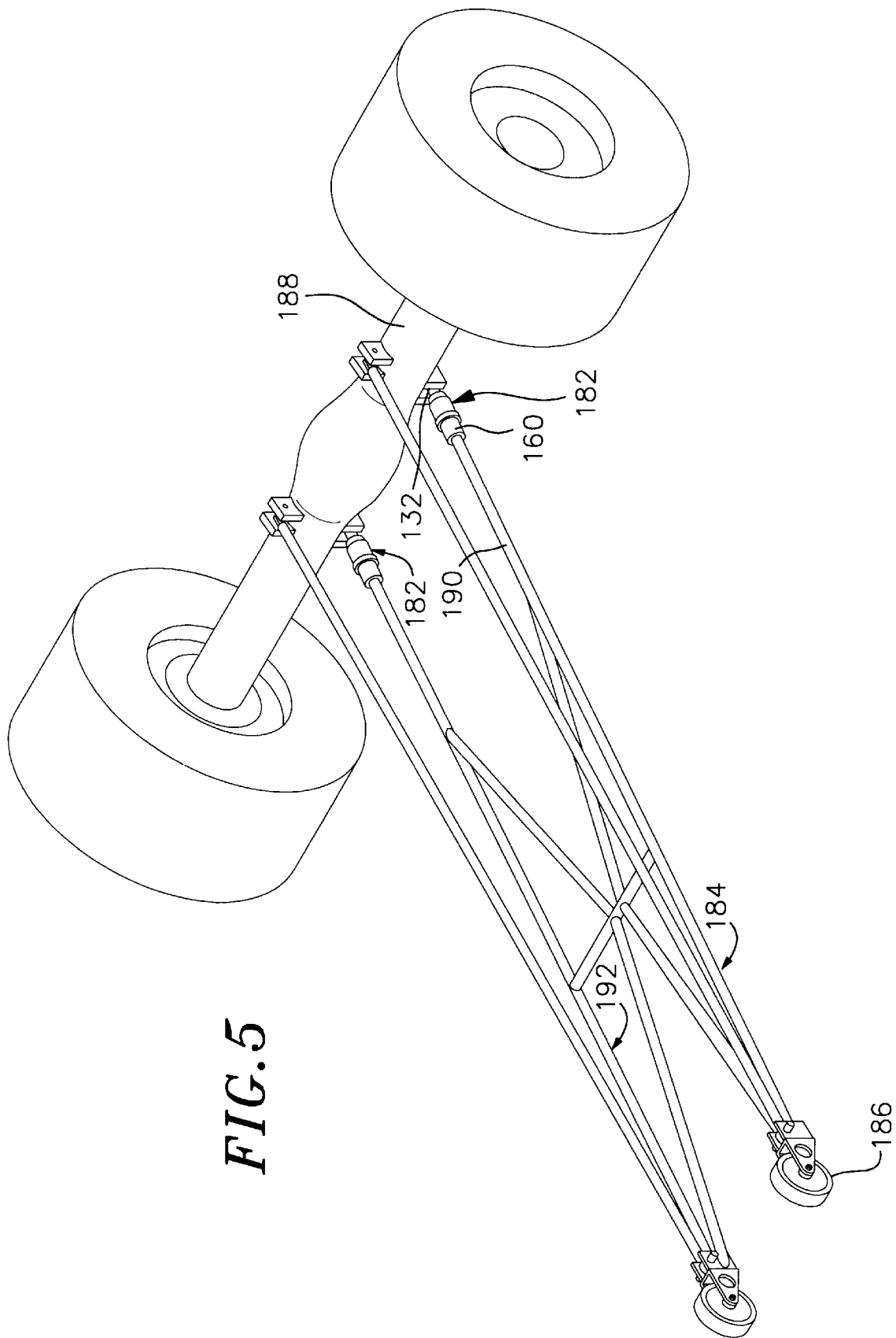
FIG. 5 is a schematic perspective view of a tension lift control system comprising a pair of second embodiment lift control devices mounted to a lift control flame structure.

Referring to FIG. 5, the second embodiment device 182 is installed in a frame structure 184 similar to that illustrated in FIG. 1. The first embodiment device is constructed to operate in tension service, i.e., where a tension force exerted on the piston during conditions of maximum acceleration causes the piston to be moved axially within the pneumatic chamber. The second embodiment device 182 is, therefore, attached in a location of the frame structure that is subjected to tension loads during the maximum acceleration of the race car due to the lifting of the front end of the car and the placement of the wheels 186 against the ground in response thereto.

In a first exemplary tension lift control system embodiment, the device 182 is attached at its mounting chamber 132 to a clevis pin or the like that is attached adjacent the rear chassis or suspension 188, and is attached at its tube chamber 160 to a tube end 190 of a tension member 192 of the frame structure 184. Like the first embodiment device, the number of second embodiment devices 182 that are attached to the frame structure depends on its particular structure design.

In second exemplary tension lift control system embodiment (not shown), the second embodiment device may be mounted to a tension member of the frame structure adjacent the frame structure wheel 186, rather than adjacent the rear chassis or suspension. However, in practice, because the tension frame member is closest to the ground it is desirable to mount the device(s) adjacent the rear chassis or suspension as this is the point where greatest ground clearance is achieved. In either case, the device serves the same purpose under tension load conditions. The choice of location for the device also depends on such factors as the design of the car and the ease of accessing the device for any needed pressure adjustments.

It is to be understood that the lift control frame structures described above and illustrated with respect to lift control systems are but one example of a type of frame structure that can be used in conjunction with pneumatic lift control devices of this invention, and that differently sized and/or configured frame structures can also be used with such device to construct lift control systems. Accordingly, the use of such alternatively sized and/or configured frame structures in constructing lift control systems are intended to be within the scope of this invention.

Lift control systems comprising pneumatic lift control devices of this invention operate to progressively control the amount that the front end of the car lifts away from the ground under conditions of maximum acceleration in the following manner. Once the car has started its acceleration run and the front end begins to lift away from the ground, the wheel(s) of the lift control frame structure contact the ground. This contact causes the compression member of the frame structure to be compressed and the tension member of the frame structure to be tensioned. Depending which embodiment of the device is employed, the compression or tension force act on the device piston and cause it to be axially displaced within the housing pneumatic chamber. The amount of pressure that is initially charged in the chamber will determine the amount of progressive resistance that the piston encounters to axial displacement within the chamber. The piston will encounter progressive resistance to axial displacement within the chamber due to the increase in resisting pressure as the volume of the chamber decreases with piston movement.

As the piston continues its axial displacement within the chamber, the snubber becomes trapped between the piston and the housing, causing it to become elastically deformed within the chamber. As described above, the elastic deformation of the snubber is also progressive and contributes to the progressive resistance to piston movement provided by the increasing resisting pressure within the chamber. Once the snubber has been elastically deformed to fill all chamber voids it becomes incompressible, at which time axial displacement of the piston terminates.

The use of the device to afford a progressive rate of piston movement avoids the harsh transmission of compression or tension forces to the rear chassis or rear suspension of the race car, now produced by the use of frame structures alone, which causes the rear tires to be unloaded at the point in time when loading is needed most, i.e., during maximum acceleration when maximum rear wheel loading is needed to ensure maximum rear wheel traction. Instead, the progressive rate of piston movement, and progressive transmission of compression or tension forces to the race car, provided by the race car minimizes or eliminates altogether the unloading of the rear tires.

Accordingly, lift control systems incorporating pneumatic lift control devices constructed according to principles of this invention offer advantages over existing frame structure type devices in that they: (1) provide a progressive rate of lift control that minimizes or altogether eliminates rear wheel unloading during conditions of maximum acceleration; and (2) allow the user a relatively easy method of adjustment, but varying the amount of pressure that is charged to the device, rather than having to physically alter the frame structure geometry.

Although limited embodiments of lift control devices and lift control systems incorporating such devices have been specifically described and illustrated herein, and specific dimensions have been disclosed, many modifications and variations will be apparent to those skilled in the art. Accordingly, it is to be understood that, within the scope of the appended claims, lift control devices and systems according to principles of this invention may be embodied other than as specifically described herein.

What is claimed is:

1. A lift control device for controlling the amount of front end lift in an automobile during acceleration, the device comprising:
    a housing having an annular chamber disposed therein;
    a piston slidably disposed axially within the annular chamber;
    means for retaining the piston within the annular chamber; wherein the a pressure-tight seal is formed between the piston and the annular chamber to prevent pressure loss from the chamber during slidable movement of the piston; and
    a snubber disposed within the annular chamber between the piston and portion of the housing to resist axial displacement of the piston within the chamber, the snubber being formed from an elastically deformable material;
    wherein the piston is adapted to accommodate attachment with a first structural member; and
    means for connecting the housing to a second structural member.

2. The device as recited in claim 1 wherein the piston comprises a piston flange that extends radially a distance from a piston shaft, the piston flange being disposed within the chamber and including a seal groove disposed around a radial edge and a flange seal disposed within the seal groove, wherein the piston shaft extends axially a distance from the piston flange to a position outside of the chamber.

3. The device as recited in claim 2 wherein the means for retaining the piston comprises a piston gland attached to an open end of the housing, the piston gland including a piston shaft opening for accommodating placement of the piston shaft therethrough.

4. The device as recited in claim 2 wherein the housing includes a reduced diameter section at one end having a piston shaft opening for accommodating placement of the piston shaft therethrough.

5. The device as recited in claim 4 wherein the means for retaining the piston comprises a structural mounting member attached to an open end of the housing.

6. The device as recited in claim 3 wherein the snubber is attached to the piston flange adjacent the piston flange.

7. The device as recited in claim 4 wherein the snubber is in the form of a donut that is slidable disposed around the shaft section of the piston.

8. A lift control device for controlling the amount of front end lift in an automobile during acceleration, the device comprising:
    a housing having an annular chamber extending therethrough from a closed housing end to an open housing end;
    a piston slidably disposed axially within the annular chamber, the piston having a radially extending piston flange and an axially extending piston shaft, wherein the piston flange is disposed completely within the chamber and comprises a seal disposed circumferentially therearound to provide a pressure-tight seal within the chamber;
    means for pneumatically pressurizing the annular chamber;
    a piston gland attached to the housing open end and having a piston opening therein for accommodating placement of the piston shaft section therethrough;
    a snubber disposed within the annular chamber between the piston flange and the housing closed end;

wherein the piston shaft is adapted to accommodate attachment with a first structural member; and wherein the housing is adapted to accommodate attachment with a second structural member so that when the first and second structural members are subjected to compressive loads the piston is axially displaced within the chamber.

9. A lift control device for controlling the amount of front end lift in an automobile during acceleration, the device comprising:

a housing having an annular chamber extending therethrough from a reduced diameter section to an open housing end;

a piston slidably disposed axially within the annular chamber, the piston having a radially extending piston flange and an axially extending piston shaft, wherein the piston flange is disposed completely within the chamber and comprises a seal disposed circumferentially therearound, wherein the reduced diameter section includes a piston shaft opening therein for accommodating placement of the piston shaft therethrough, the piston shaft opening having a piston seal disposed circumferentially therein to provide a pressure-tight seal within the chamber;

means for pneumatically pressurizing the annular chamber;

a structural attachment member attached to the open end of the housing to retain the piston within the chamber, and being adapted to accommodate attachment with a first structural member;

a snubber disposed within the annular chamber between the piston flange and the housing reduced diameter section, the snubber having a donut-shaped configuration and being slidable disposed around the piston shaft;

wherein the piston shaft is adapted to accommodate attachment with a second structural member so that when the first and second structural members are subjected to tension loads the piston is axially displaced within the chamber.

* * * * *